(12) United States Patent
Pallister et al.

(10) Patent No.: US 12,484,750 B2
(45) Date of Patent: Dec. 2, 2025

(54) VACUUM CLEANING MACHINES

(71) Applicant: Beacon Group International Products Ltd., Epsom (GB)

(72) Inventors: Arthur Pallister, St Austell (GB); Michael Ching, Stade (CH)

(73) Assignee: BEACON GROUP INTERNATIONAL PRODUCTS LTD., Epsom (GB)

( * ) Notice: Subject to any disclaimer, the term of this patent is extended or adjusted under 35 U.S.C. 154(b) by 349 days.

(21) Appl. No.: 17/759,334

(22) PCT Filed: Jan. 25, 2021

(86) PCT No.: PCT/GB2021/050170
§ 371 (c)(1),
(2) Date: Jul. 22, 2022

(87) PCT Pub. No.: WO2021/148823
PCT Pub. Date: Jul. 29, 2021

(65) Prior Publication Data
US 2023/0039472 A1 Feb. 9, 2023

(30) Foreign Application Priority Data
Jan. 24, 2020 (GB) ..................................... 2001027

(51) Int. Cl.
*A47L 9/28* (2006.01)
*A47L 7/00* (2006.01)
(Continued)

(52) U.S. Cl.
CPC ........... *A47L 9/2805* (2013.01); *A47L 7/0004* (2013.01); *A47L 7/0061* (2013.01); *A47L 9/12* (2013.01);
(Continued)

(58) Field of Classification Search
None
See application file for complete search history.

(56) References Cited

U.S. PATENT DOCUMENTS

| 5,047,597 A | 9/1991 | Scott |
| 6,073,302 A * | 6/2000 | Buscher ................ A47L 9/2842 96/418 |

(Continued)

FOREIGN PATENT DOCUMENTS

| EP | 1752077 A2 | 2/2007 |
| EP | 3818920 A1 | 5/2021 |

(Continued)

OTHER PUBLICATIONS

English Machine Translation for KR20130012518A.*

*Primary Examiner* — Kaj K Olsen
*Assistant Examiner* — Pradhuman Parihar
(74) *Attorney, Agent, or Firm* — Simpson & Simpson, PLLC (57) ABSTRACT

A vacuum machine comprising: a housing for receiving vacuumed matter and at least two removably attachable accessories; sensing means for detecting the accessories; a control circuit communicatively coupled with the sensing means; the sensing means being arranged to generate a first signal to the control circuit representative of the presence of a first accessory, a second signal representative of the presence of two accessories, the control circuit being arranged to preventing operation of the vacuum machine when the first signal is received and to allow operation of the vacuum machine when the second signal.

19 Claims, 5 Drawing Sheets

(51) Int. Cl.
*A47L 9/12* (2006.01)
*A47L 9/14* (2006.01)
*A61L 2/10* (2006.01)
*A61L 2/26* (2006.01)

(52) U.S. Cl.
CPC ........... *A47L 9/1409* (2013.01); *A47L 9/2836* (2013.01); *A47L 9/2894* (2013.01); *A61L 2/10* (2013.01); *A61L 2/26* (2013.01); *A61L 2202/11* (2013.01)

(56) References Cited

U.S. PATENT DOCUMENTS

| | | |
|---|---|---|
| 2006/0278088 A1* | 12/2006 | Helsel ................. A47L 7/04 96/224 |
| 2013/0025085 A1 | 1/2013 | Hun et al. |
| 2014/0196245 A1* | 7/2014 | Liter .................. A47L 9/2868 15/339 |
| 2019/0167059 A1 | 6/2019 | Bissell |
| 2019/0191952 A1 | 6/2019 | Bissell |
| 2019/0365177 A1 | 12/2019 | Techtronic |

FOREIGN PATENT DOCUMENTS

| | | | | |
|---|---|---|---|---|
| KR | 20130012518 A | * | 2/2013 | ............ A47L 9/0411 |
| WO | 2018/099489 A1 | | 6/2018 | |

* cited by examiner

VACUUM CLEANING MACHINES

CROSS-REFERENCE TO RELATED APPLICATIONS

The present application is the national stage application pursuant to 35 U.S.C. § 371 of International Patent Application No. PCT/GB2021/050170, filed Jan. 25, 2021, which claims priority from United Kingdom Patent Application No. 2001027.8, filed Jan. 24, 2020, which applications are incorporated herein by reference in their entireties.

FIELD

The present invention relates to vacuum cleaning machines capable of operating in a wet or dry pickup mode and vacuum cleaning machine accessories with improved safety capabilities.

BACKGROUND

Vacuum cleaning machines operable in wet or dry-cleaning operations are well known. When using wet and dry vacuum cleaners, it is normal procedure to remove the dry dust filter before using the vacuum cleaner for wet debris. It is important in the case of using a vacuum for collecting substantially dry dust, that the dust is safely contained using the correct air filter and dust filter bag. A problem exists in that currently there is little to prevent vacuum cleaners from being misused or used when configured in the wrong configuration without a suitable dust filter or dust filter bag in a correct position. If the correct filter is not in place, there is nothing to prevent hazardous dust from being exhausted into the atmosphere, which can be potentially dangerous for the user and others nearby who may breathe in the air that has passed through the vacuum cleaner. If the correct dust filter bag is not in position, then it becomes far more difficult and hazardous to dispose of the potentially dangerous dust that is collected by the vacuum cleaner. A specific problem in the construction industry is where there is a risk of harmful substances such as Silica, MDF and even asbestos being collected by a vacuum and it is therefore necessary to ensure that the dust collected can be safely contained and disposed of.

Other specific problems can include vacuum of heated waste such as cigarettes or other combustible material, where there is a risk that residual heat may damage the vacuum cleaning machine or be exacerbated further causing a safety hazard.

There is a need to monitor vacuum cleaning machines for the correct installation of features such as particulate filters in specific modes of vacuum operation, before allowing the machine to be activated.

SUMMARY

According to a first aspect of the present invention, a vacuum machine comprising: a housing for receiving vacuumed matter and at least two removably attachable accessories; sensing means for detecting the accessories; a control circuit communicatively coupled with the sensing means; the sensing means being arranged to generate a first signal and a second signal, and to output the first and second signal to the control circuit the first signal representative of the presence of a first accessory, a second signal representative of the presence of two accessories, the control circuit being arranged to prevent operation of the vacuum machine when the first signal is received and to allow operation of the vacuum machine when the second signal is received.

Advantageously, the machine is only configured to operate as a dry vacuum cleaner when the correct accessories are included thereby adhering to safety regulations, while also maintaining the ability to operate in a wet mode without one or more accessories.

In an embodiment, the first signal is representative of a non-operative state of the vacuum machine, and the second signal is representative of a dry vacuuming state.

In an embodiment, the sensing means is further arranged to generate a third signal representative of the absence of accessories.

In an embodiment, the third signal is representative of a wet vacuuming state.

In an embodiment, the third signal comprises the absence of an output from the sensing means.

In an embodiment, the control circuit is further arranged to allow operation of the vacuum machine when the third signal is received.

In an embodiment, the first accessory comprises a filter.

In an embodiment, the sensing means is activated in dependence of a proximity of the first accessory to the sensing means.

In an embodiment, the at least two removably attachable accessories, each comprise identification means which is sensed by the sensing means. Optionally, the sensing means, and identification means, comprise a radio frequency detector and uniquely identifiable passive radio frequency tags, respectively.

In an embodiment, the vacuum machine further comprises a wireless receiver for receiving remote signals for operating the vacuum machine.

In an embodiment the vacuum machine comprises a wet and dry vacuum machine reconfigurable between a wet vacuuming state for vacuuming liquids and wet debris and a dry vacuuming state for vacuuming substantially dry debris.

In an embodiment the vacuum machine further comprises a treatment means for treating the vacuumed matter with ultraviolet radiation According to a second aspect of the present invention, there is provided a kit of removably attachable accessories for a vacuum machine according to the first aspect, the accessories comprising: a receptacle comprising an unique identification means; and, a filter comprising an unique identification means.

According to a third aspect of the invention, there is provided a method of activating a vacuum machine according to the first aspect, the method comprising: sensing a presence of at least two removably attachable accessories; generating a first signal representative of the presence of a first accessory; generating a second signal representative of the presence of two accessories; preventing operation of the vacuum machine when the first signal is received; and, allowing allow operation of the vacuum machine when the second signal is received.

According to a fourth aspect of the invention, there is provided a filter system for a vacuum machine, the system comprising: a housing detachably couplable to the vacuum machine, the housing comprising an inlet for receiving air containing debris into the housing, and an outlet via which cleaned air can exit the housing; at least one filtering means disposed within the housing, the filtering means comprising a filter medium configured to separate debris from the air passing from the inlet to the outlet through the filter medium; a thermal sensor and a fluid release means disposed within the housing, wherein the thermal sensor and fluid release means are communicatively coupled such that activation of the thermal sensor is configured to initiate the fluid release means.

In an embodiment, the filtering system further comprises a second filtering means disposed within the housing.

In an embodiment, the thermal sensor is communicatively coupled to a control circuit of the vacuum machine, the control circuit being configured to cease operation of the vacuum machine when the thermal sensor is activated.

In an embodiment, the thermal sensor is communicatively coupled to an alarm which is configured to activate when the thermal sensor is activated.

In an embodiment, the fluid release means comprises a fluid reservoir of gas or liquid matter.

In an embodiment, filter system further comprises a treatment means for treating the air containing debris within the housing with ultraviolet radiation. The treatment means may be located within the second filtering means.

In an embodiment, the housing may include a reflective internal surface.

According to a fifth aspect of the present invention, there is provided a filter system assembly for a vacuum machine; the assembly comprising a filter system according to the fourth aspect; and, further comprising a thermal sensor and fluid release means disposed on the vacuum machine.

According to a sixth aspect of the invention, there is provided a method of operating a vacuum machine comprising a filter system according to the fourth aspect, the method comprising: sensing a temperature within a housing comprising the filter means; activating the fluid release means when a threshold temperature is exceeded; ceasing operation of the vacuum machine; and, activating an alarm.

These and other objects, features, and advantages of the present invention will become readily apparent upon a review of the following detailed description of the invention, in view of the drawings and appended claims.

BRIEF DESCRIPTION OF THE DRAWINGS

The invention may be produced in various ways and an embodiment thereof will now be described, by way of example only, reference being made to the accompanying drawings, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
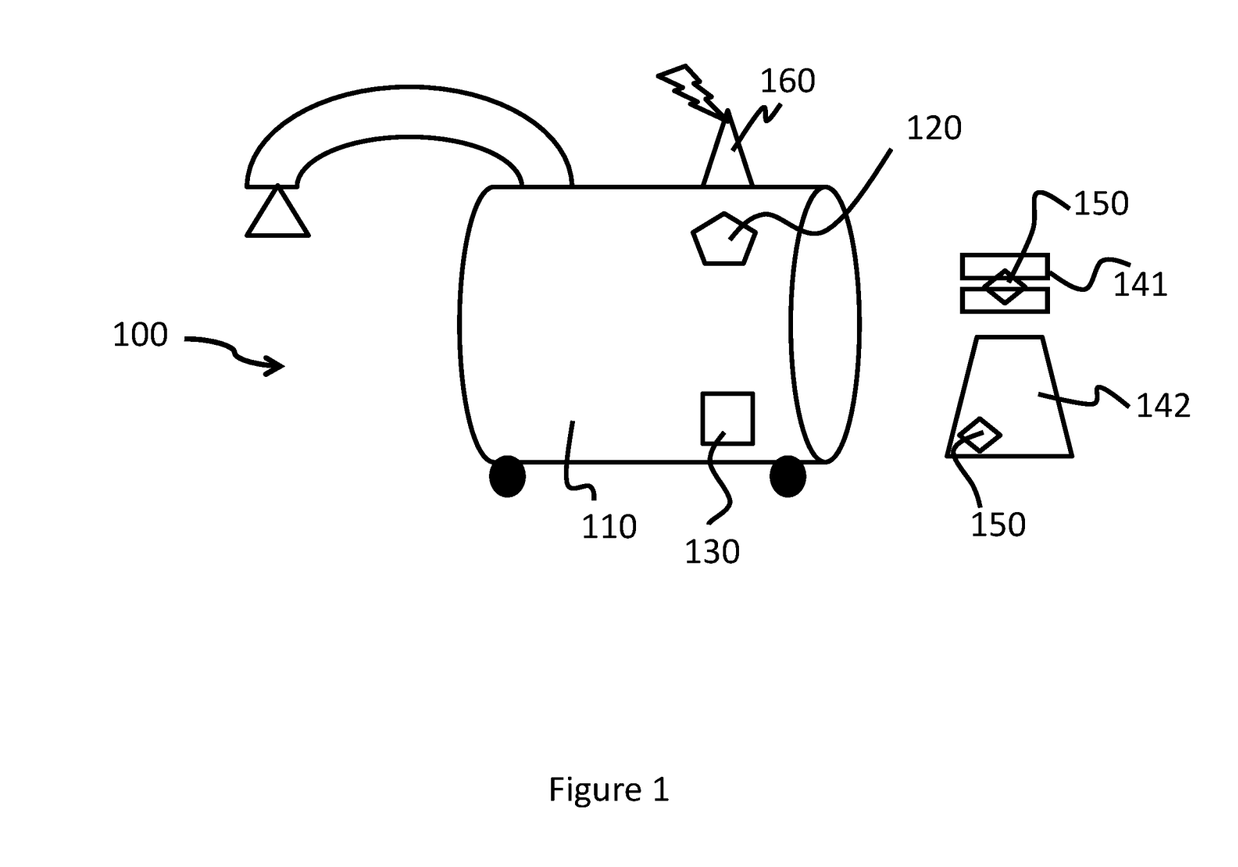
FIG. 1 is a schematic illustration of a wet and dry vacuum machine according to an embodiment of the first aspect present invention.

Referring to FIG. 1 of the drawings, there is illustrated a vacuum machine (100) according to an embodiment of the present invention. The vacuum machine comprises a housing (110) for receiving vacuumed matter and at least two removably attachable accessories (141,142). The vacuum machine may be capable of being operated as a wet vacuum for vacuuming liquid or wet debris, when there are no accessories (141,142) within the housing, and also as a dry vacuum for vacuuming dry or substantially dry dirt and debris, when both accessories, such as a dust receptacle (142), which may comprise a bin or bag for example, and a cartridge filter (141) are correctly installed within the housing (110).

The vacuum machine further comprises sensing means (120) for detecting the presence of the accessories, and a control circuit (130) communicatively coupled with the sensing means (120). The sensing means (120) is arranged to detect the presence of the accessories and more specifically the correct installation of the accessories within the housing, and output a signal to the control circuit in dependence of the presence of the accessories. The sensing means is arranged to generate a first signal which is representative of the presence of a first accessory, a second signal which is representative of the presence of two accessories. In an embodiment, the sensing means is further configured to output a third signal representative of the presence of no accessories. The third signal may in fact be the absence of any output from the sensing means. The control circuit (130) is arranged to prevent operation of the vacuum machine (100) when the first signal is received and to allow operation of the vacuum machine (100) when the second signal or third signal is received. This ensures that the vacuum machine will only operate when it is correctly configured thereby minimising damage to the machine and harm to the operator.

The removably attachable accessories (141, 142) each comprise respective identification means (150) which are capable of being interrogated and thus sensed by the sensing means (120). This sensing or interrogation of the accessories ensures that the accessories are present and correctly located within the housing, before the control circuit can permit an operation of the vacuum machine. The sensing means (120) and identification means (150) may comprise a radio frequency detector and unique identifiable passive radio frequency tags, respectively. Other technologies of wireless communication are likely suitable and envisaged for the sensing function.

The operation of the sensing means (120) may be activated by the presence of an accessory (141). The sensing means may not be activated until a filter (141) has been placed in the machine. For example, a machine could operate in the wet mode with a bag (142) located in the housing.

The vacuum machine (100) may further include a wireless receiver (160) for receiving remote signals for operating the vacuum machine (100). The receiver is communicatively coupled with the sensing and control circuit to enable or disable operation of the vacuum machine. Other technologies of wireless communication are likely suitable and envisaged for the remote control.

Optionally, the vacuum machine (100) may comprise a detachably coupleable treatment means located within the housing (110) for treating the vacuumed matter. The treatment means may comprise a source of ultraviolet radiation, such as a UV tube. It is a known technology to use ultraviolet (UV) lamps with a specific wavelength (UV-C) to destroy and disrupt the DNA of bacteria and viruses on surfaces, in water and in the air. For this to be effective within vacuum cleaning machines a threshold dose of UV radiation needs to be applied in order to ensure an effective sterilisation of air. UV lamps have been found to work advantageously with a wavelength of 253.7 nm (nanometers).

In an exemplary embodiment, locating a dry cartridge filter (141) within the housing is arranged to activate the sensing means (120), which subsequently interrogates the cartridge for the associated identification means to determine if the filter cartridge is the correct filter cartridge (141) via the unique identification means. The sensing means also makes a secondary check to determine if the correct bag (142) is also in position and outputs the respective signal to the control means which determines whether the vacuum machine is operable in the dry or wet state. The sensing means may comprise a low radio frequency, close proximity passive RFID reader controller (120) which is arranged to detect for the presence of a minimum of two or more RFID tags (150). If at least two or more accessories are not detected, or not detected in the correct position, the control means is arranged to prevent the vacuum machine operating in a dry vacuuming mode, such as by preventing power supply to an impeller or fan (not shown) for creating the vacuum, for example. In this circumstance, it is the placement of the dry filter cartridge part (141) that activates the sensing, namely the RFID reader controller, to sense for the presence of the accessories. By removing the monitored dust filter (141) and bag (142) (to use the machine for wet) the sensing means may output a signal to the control means thereby enabling operation of the vacuum machine in the wet state. The same may be programmed to prevent the machine being used for vacuuming wet debris when filters (141) and bags (142) are in position, although this is not required in all embodiments. The passive RFID tag (150) is positioned to ensure that the RFID reader (120) is disposed in close proximity with the tag this can be achieved with a mechanical interface not dependent on RFID. If either tag (150) is removed or positioned incorrectly, the sensing means will not be able to sense or interrogate the tag and thus determine the identity or orientation of the accessory.

A microcontroller (130) or controller firmware specifically dictates that two or more passive RFID readers must be processed together by only the one microcontroller or controller. The detection circuit (130) also conditionally activates an optional receiver (160) (for remote on/off) to enable the vacuum machine (100) to be switched on by a remote switch or other sensor, so that remote control function can also be used only if the correct dry filter accessories are in place, or in the mode of wet operation, that the same is removed. The remote switch could be a simple press activated sender as in a car key fob or keyless ignition based on close proximity (such as within 2 m) of the key to the machine, but it could also be some other kind of switch automatically activated by the vibration or noise of a power tool or by the function of the power tool. Furthermore the protection circuit (130) could incorporate a plug and play programmable receiver (like a Bluetooth computer mouse) so that it is a simple matter for user to configure the protection circuit (e.g. at or after point of sale) with a unique switch by some external means, either a USB receiver socket on the vacuum or Bluetooth or similar remote programmable means.

During use of the machine (100), a user decides the operational state for the vacuum, namely wet or dry. If the vacuum is to be used in a dry vacuuming state, the user should insert a filter (141) and bag (142). If the user has not installed the accessories correctly, the sensing means (120) will detect the identification means (150) located on the accessories or lack thereof and output the appropriate signal to the control circuit. The control circuit (130) will prevent the vacuum from operating in the dry vacuuming mode if only the first accessory (filter) is detected (by generating a first signal) or if one or both of the accessories are misaligned within the housing, or do not contain the correct unique identification (such as on proprietary filters). If both accessories are installed correctly, the sensing means will generate a second signal which is output to the control means. The control means will subsequently enable operation of the vacuum machine. To operate the vacuum machine (100) in a wet vacuuming state, the accessories should be removed; when there are no accessories installed or only a secondary accessory (not a filter), the sensing means (120) will generate a third signal, which may comprise the absence of an output from the sensing means, and the control circuit (130) will allow operation of the machine.

In an embodiment, the user may operate the machine (100) remotely using the wireless sender/receiver (160), and feedback could be provided to the user, to let the user know which state the vacuum was in prior to use. For example, the remote sender receives a signal that illuminates a green LED if operating in dry mode or a blue LED if operating in wet mode.

Figure 2:
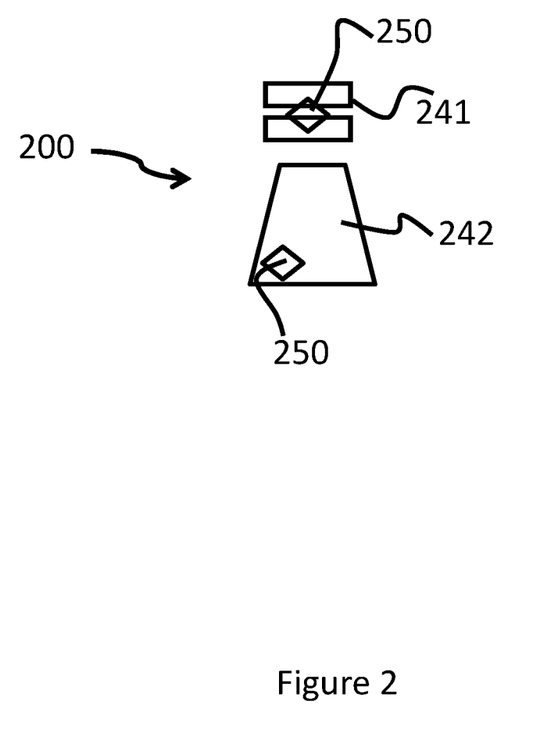
FIG. 2 is a schematic illustration of a kit of accessories according to an embodiment of the second aspect of present invention.

A kit of removably attachable accessories for a vacuum machine (100) is shown in FIG. 2, the accessories comprising: a filter (241) comprising unique identification means (250), and, a receptacle (242) comprising unique identification means (250).

A method of activating a vacuum machine is described below with reference to FIG. 3. The method (300) comprises sensing a presence of at least two removably attachable accessories (310), generating a first signal representative of the presence of a first accessory (320), generating a second signal representative of the presence of two accessories (330) and in an embodiment, generating a third signal representative of the presence of no accessories (340). The method is arranged to prevent operation of the vacuum machine when the first signal is received (350) and allow operation of the vacuum machine when the second signal or third signal is received (360), wherein the third signal may be the absence of a signal.

Figure 4:
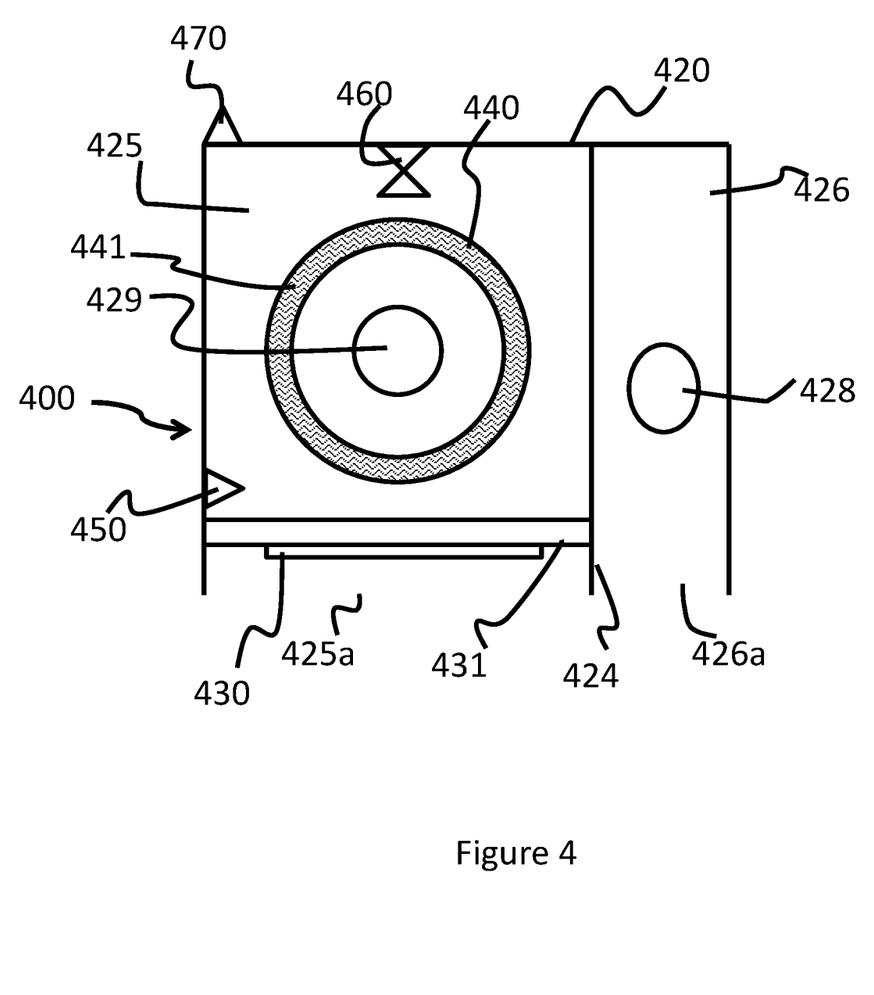
FIG. 4 is a schematic illustration of the filtering system according to an embodiment of the fourth aspect of the present invention; and, FIG. 5 is a flow diagram showing an embodiment of a method according to the fifth aspect of the present invention.

Referring to FIG. 4 of the drawings, there is illustrated a filtering system (400) according to an embodiment of the present invention for use with a vacuum cleaner. The filtering system is configured to respond to inflammable material and negate potential damage from residual heat by operating a fire suppression mechanism. The filtering system comprises a housing (420) removably detachable to a vacuum machine such as in FIG. 1 or a bin. The housing (420) comprises a partition (424) disposed therein which divides the interior of the housing (420) into at least a first chamber (425) and a second chamber (426). The first chamber (425) and the second chamber (426) comprise a respective opening (425a, 426a). The housing (420) may be made of any rigid material, such as metal or plastics material.

The housing (420) further comprises an inlet (428) which is configured for receiving vacuumed particulate matter into the housing and an outlet (429) via which cleaned air can exit the housing. In particular, the inlet may have a diameter of at least 80-100 mm. The filtering system with the inlet of such size is in particular suited for being disposed upon wheelie bins of square or rectangular cross-section and having capacity of at least 120 l. The inlet may be further connected to a flexible hose or duct. The hose or duct may have a length of at least 1.2 m and a diameter of at least 80 mm. The filtering system may also be sized to be disposed upon a wheelie bin having a capacity of 240 L or 360 L.

In particular, the outlet (429) is disposed within a wall of the housing defining the first chamber (425), and the inlet (428) is disposed within a wall of the housing defining the second chamber (426). The inlet (428), first and second chamber openings (425a, 426a) and the outlet (429) are configured to communicate a flow of air from the inlet (428) via the chamber openings (425a, 426a) to the outlet (429).

The first filtering means (430) comprises a filter medium configured to separate matter from the vacuumed particulate matter passing from the inlet (428) to the outlet (429). The first filtering means (430) may comprise a rectangular panel (431) having a plurality of apertures defining a mesh, the panel (431) being adapted to cover at least a portion of the opening of the bin when the housing (420) is configured in the operative configuration.

The housing (420) can further comprise a second filtering means disposed within the first chamber (425) of the housing (420), downstream from the first filtering means (430). The second filtering means can comprise a cylindrical drum (440) having an outer curved surface which may be corrugated or comprise a plurality of concertina folds (441), such that the corrugations or concertina folds (441) in the outer surface extend substantially parallel to a longitudinal axis of the drum (440).

Optionally, the housing (420) may comprise a detachably coupleable treatment means located along the flow of air between the inlet (428) and the outlet (429) for treating the particulate laden air. The treatment means may comprise a source of ultraviolet radiation, such as a UV tube. The treatment means may be placed in any position between any of: the inlet; first filter means; second filter means; outlet; or duct. Furthermore an inside of the housing (420) may be provided with a reflective surface to improve the efficiency of the treatment means by reflecting the UV rays. The treatment means may be placed within the second filtering means, such that bacteria and viruses on the corrugations or concertina folds (441) are treated.

The housing (420) further includes a thermal sensor (450) and a fluid release means (460). The thermal sensor is placed within proximity to a filtering means (430,440) such that it can sense the presence of any vacuumed matter stopped by the filter which exceeds a pre-set temperature level, for example a still lit cigarette butt or hot ash. The thermal sensor (450) can be communicatively couple to a control circuit of the vacuum machine (such as FIG. 1) and an alarm (470) (internal or external). The alarm (470) may be an audible and/or visual alarm such as a led and speaker. If the thermal sensor is activated it can activate the fluid release means (460) to suppress the excessive heat, it may also activate the alarm (470) and shut down the vacuum machine. The fluid release means (460), may include a reservoir of gas or liquid, attached to a spray, sprinkle or nozzle.

Figure 3:
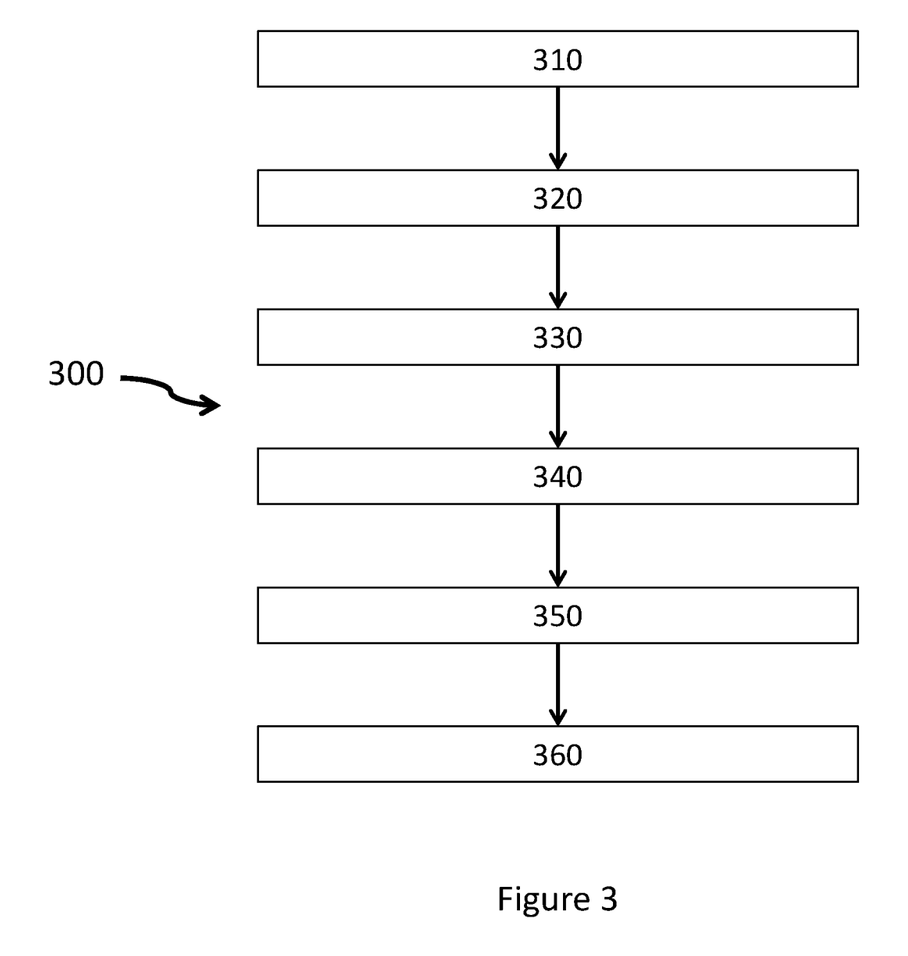
FIG. 3 is a flow diagram showing an embodiment of the method according to the third aspect of the present invention.

The filter system (400) can also be fitted with the sensing means (120) and associated features as describe with respect to FIGS. 1 to 3.

The filter system (400) of the present invention may be incorporated in a vacuum cleaner. The vacuum cleaner may be suitable for indoor use, for example in houses to remove dirt and like from floors, rugs and other house surfaces. The vacuum cleaner may also be adapted for use outdoors, such as on the streets or in industrial areas, to remove dirt, dust and larger particles of waste, including used cigarettes, drinking cans and plastic bags.

Prior to use of a vacuum machine in an environment where there may be inflammable material a user can install a filter system (400). If the user has not installed the filter system correctly, a sensing means (120) may detect an identification means (150) located on the filter system (400) or lack thereof and can generate signals. The control circuit (130) can prevent the vacuum from operating if the filter is not correctly installed. The vacuum machine can then be used in a known manner to vacuum debris. If the vacuum debris contains a hot item, when it is caught by a filtering means (430,440) the thermal sensor (450) will sense if the temperature. If the heat exceeds a safe limit the thermal sensor (450) being coupled to the fluid release means (460) can trigger the means to suppress the heat, the thermal sensor (450) can also be in contact with the control circuit (120) of the vacuum machine to cease operation of the machine and also activate an alarm (470). The vacuum operation can then be stopped safely, the machine made safe and following any repairs be returned to use again.

The filtering system (400) may also form part of an assembly with features of a vacuum machine to further improve the safety of the vacuum machine. In an embodiment the thermal sensor (450) may be disposed at the inlet (428) of the housing upstream of the first filtering means (430). It is also conceived that the thermal sensor (450) may be disposed at any other suitable point within the housing (420) or the filter system, for example upstream or downstream of the second filtering means or disposed at a suitable position between the inlet (428), outlet (429), first and second filtering means (430,440). Alternatively, or additionally, there may be a further thermal sensor located within the vacuum machine body or a bin of attachable to the vacuum machine in a suitable position to sense a potential hazard, forming an assembly. Likewise, in an embodiment the fluid release means (460) may be disposed at the inlet (428) of the housing upstream of the first filtering means (430). It is also conceived that the fluid release means (460) may be disposed at any other suitable point within the housing (420) or the filter system, for example upstream or downstream of the second filtering means or disposed at a suitable position between the inlet (428), outlet (429), first and second filtering means (430,440). Alternatively, or additionally, there may be a further fluid release means located within the vacuum machine body or a bin of attachable to the vacuum machine in a suitable position to dose a potential hazard, forming an assembly.

Figure 5:
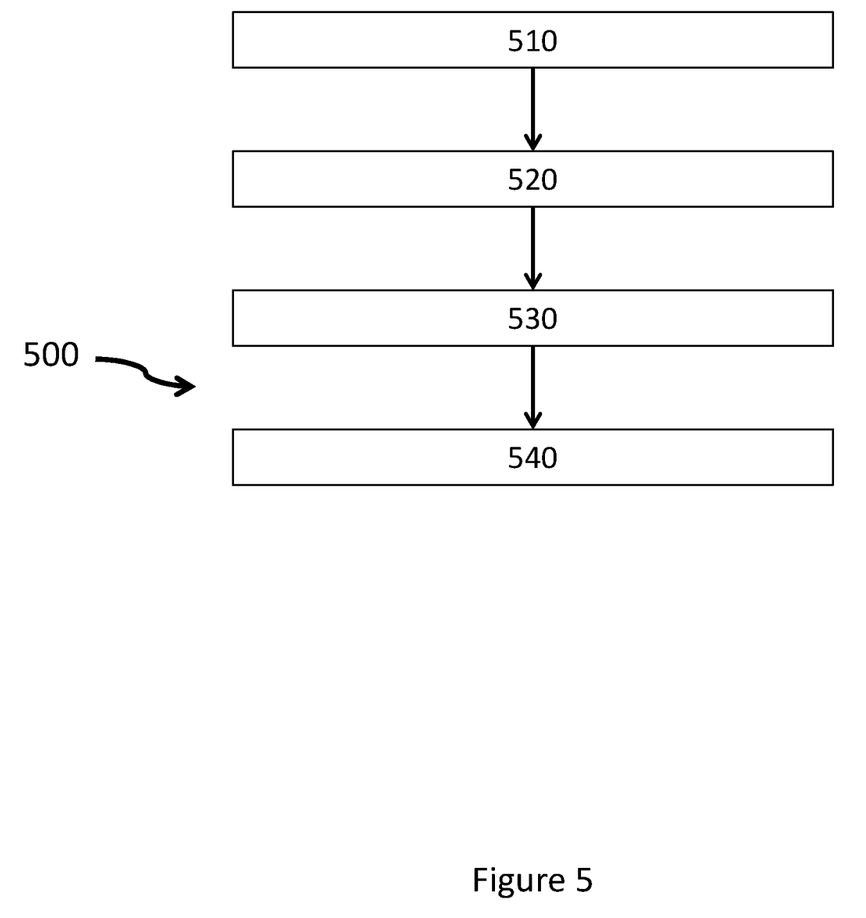

A method of operating a vacuum machine with the filter system is described below with reference to FIG. 5. The method (500) comprises sensing a temperature within the housing of the filter system comprising the filter means (510) and activating the fluid release means when a threshold temperature is exceeded (520). The method further comprises ceasing operation of the vacuum machine (530) and activating an alarm (540).

Select embodiments of the invention only have been described and illustrated, and it will be readily apparent that other embodiments, modifications, additions and omissions are possible within the scope of the invention.

The invention may be varied according to requirements, including but not limited to physical dimensions or construction materials, having as its objective the ability to monitor the machine for the correct installation of accessories for a mode of operation before allowing the machine to be activated and monitor the filter for safety from inflammable objects.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS 100. vacuum machine
110. vacuum machine housing
120. sensing means
130. control circuit
141. filter cartridge
142. vacuum bag
150. identification means
160. wireless receiver
400. filtering system
420. filtering system housing
424. partition
425. first chamber
425a. first chamber opening
426. second chamber
426a. second chamber opening
428. inlet
429. outlet
430. first filtering means
431. mesh panel
440. second filtering means
441. concertina folds
450. thermal sensor
460. fluid release means
470. alarm

The invention claimed is:

1. A vacuum machine comprising:
a housing for receiving vacuumed matter and at least two removably attachable accessories comprising a first accessory and a second accessory, at least the first or second accessory comprising a filter;
sensing means for detecting the first and second accessories;
a control circuit communicatively coupled with the sensing means;
wherein the sensing means is activated in dependence of a proximity of the filter to the sensing means;
the sensing means being arranged to generate a first signal, a second signal and, a third signal, and to output the first, second signal, and third signal to the control circuit, the first signal representative of the presence of the first accessory, the second signal representative of the presence of both the first and second accessories, and the third signal representative of the absence of accessories, the control circuit being arranged to prevent operation of the vacuum machine when the first signal is received and to allow operation of the vacuum machine when the second signal is received or the third signal is received.

2. The vacuum machine according to claim 1, wherein the first signal is representative of a non-operative state of the vacuum machine and the second signal is representative of a dry vacuuming state.

3. The vacuum machine according to claim 1, wherein the third signal is representative of a wet vacuuming state.

4. The vacuum machine according to claim 1, wherein the at least two removably attachable accessories each comprise an identification means which is sensed by the sensing means.

5. The vacuum machine according to claim 4, wherein the sensing means and identification means comprise a radio frequency detector and uniquely identifiable passive radio frequency tags, respectively.

6. The vacuum machine according to claim 1, further comprising a wireless receiver for receiving remote signals for operating the vacuum machine.

7. The vacuum machine according to claim 1, wherein the vacuum machine comprises a wet and dry vacuum machine reconfigurable between a wet vacuuming state for vacuuming liquids and wet debris and a dry vacuuming state for vacuuming substantially dry debris.

8. The vacuum machine according to claim 1, further comprising a treatment means for treating the vacuumed matter with ultraviolet radiation.

9. A kit of removably attachable accessory for a vacuum machine according to claim 1, the accessory comprising:
a filter comprising an unique identification means; and,
a receptacle comprising an unique identification means.

10. A method of activating a vacuum machine as claimed in claim 1, the method comprising:
sensing a presence of at least two removably attachable accessories;
generating a first signal representative of the presence of a first accessory;
generating a second signal representative of the presence of two accessories;
preventing operation of the vacuum machine when the first signal is received; and,
allowing operation of the vacuum machine when the second signal is received.

11. The vacuum machine recited in claim 1, wherein the filter comprises a filtering system, the system comprising:
a housing detachably couplable to the housing of the vacuum machine, the housing of the filtering system comprising an inlet for receiving air containing debris into the housing of the filtering system, and an outlet allowing cleaned air to exit the housing of the filtering system;
at least one filtering means disposed within the housing of the filtering system, the filtering means comprising a filter medium configured to separate debris from the air passing from the inlet to the outlet through the filter medium; and, a thermal sensor and a fluid release means disposed within the housing of the filtering system, wherein the thermal sensor and fluid release means are communicatively coupled such that activation of the thermal sensor is configured to initiate the fluid release means.

12. A vacuum machine comprising: a housing for receiving vacuumed matter and at least two removably attachable accessories comprising a first accessory and a second accessory, at least the first or second accessory comprising a filter; sensing means for detecting the first and second accessories; a control circuit communicatively coupled with the sensing means; wherein the sensing means is activated in dependence of a proximity of the filter to the sensing means; the sensing means being arranged to generate a first signal, a second signal and a third signal, and to output the first, second and third signal to the control circuit, the first signal representative of the presence of the first accessory, the second signal representative of the presence of both the first and second accessories, and the third signal representative of the absence of accessories, the control circuit being arranged to prevent operation of the vacuum machine when the first signal is received and to allow operation of the vacuum machine when the second or third signal is received, wherein the second signal is representative of the dry vacuuming state and the third claim signal is representative of the wet vacuuming state.

13. The vacuum machine according to claim 12, wherein the at least two removably attachable accessories each comprise an identification means which is sensed by the sensing means.

14. The vacuum machine according to claim 13, wherein the sensing means and identification means comprise a radio frequency detector and uniquely identifiable passive radio frequency tags, respectively.

15. The vacuum machine according to claim 12, further comprising a wireless receiver for receiving remote signals for operating the vacuum machine.

16. The vacuum machine according to claim 12, wherein the vacuum machine comprises a wet and dry vacuum machine reconfigurable between a wet vacuuming state for vacuuming liquids and wet debris and a dry vacuuming state for vacuuming substantially dry debris.

17. The vacuum machine according to claim 12, further comprising a treatment means for treating the vacuumed matter with ultraviolet radiation.

18. A kit of removably attachable accessory for a vacuum machine according to claim 12, the accessory comprising:
a filter comprising an unique identification means; and,
a receptacle comprising an unique identification means.

19. The vacuum machine recited in claim 12, wherein the filter comprises a filtering system, the system comprising:
a housing detachably couplable to the housing of the vacuum machine, the housing of the filtering system comprising an inlet for receiving air containing debris into the housing of the filtering system, and an outlet allowing cleaned air to exit the housing of the filtering system;
at least one filtering means disposed within the housing of the filtering system, the filtering means comprising a filter medium configured to separate debris from the air passing from the inlet to the outlet through the filter medium; and,
a thermal sensor and a fluid release means disposed within the housing of the filtering system, wherein the thermal sensor and fluid release means are communicatively coupled such that activation of the thermal sensor is configured to initiate the fluid release means.

\* \* \* \* \*